(No Model.)  4 Sheets—Sheet 2.

V. W. BLANCHARD.
FURNACE.

No. 289,963.  Patented Dec. 11, 1883.

Witnesses:
Phil C. Dieterich
W. R. Kuyworth

Inventor:
Virgil W. Blanchard
by M. Alexander
Attorney.

(No Model.) 4 Sheets—Sheet 3.

V. W. BLANCHARD.
FURNACE.

No. 289,963. Patented Dec. 11, 1883.

Witnesses:
Phil C. Dietrich.
T. R. Keyworth

Inventor:
Virgil W. Blanchard.
by T. A. Alexander
Attorney.

(No Model.)  V. W. BLANCHARD.  4 Sheets—Sheet 4.
FURNACE.
No. 289,963.  Patented Dec. 11, 1883.
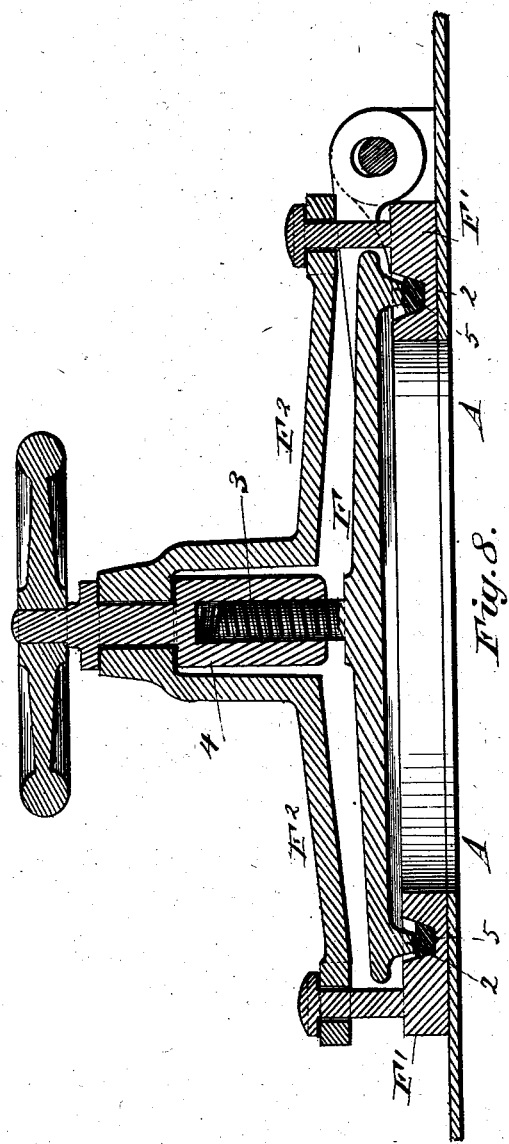
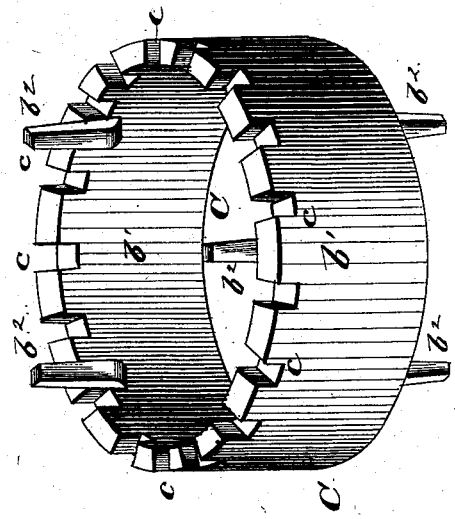
Witnesses:
Inventor:
Virgil W. Blanchard
by
Attorney.

UNITED STATES PATENT OFFICE.

VIRGIL W. BLANCHARD, OF NEW YORK, N. Y.

FURNACE.

SPECIFICATION forming part of Letters Patent No. 289,963, dated December 11, 1883.

Application filed December 11, 1882. (No model.)

*To all whom it may concern:*

Be it known that I, VIRGIL W. BLANCHARD, of New York city, in the county of New York and State of New York, have invented certain new and useful Improvements in Furnaces; and I do hereby declare that the following is a full, clear, and exact description thereof, reference being had to the accompanying drawings, and to the letters of reference marked thereon, which form part of this specification, in which—

Figure 1:
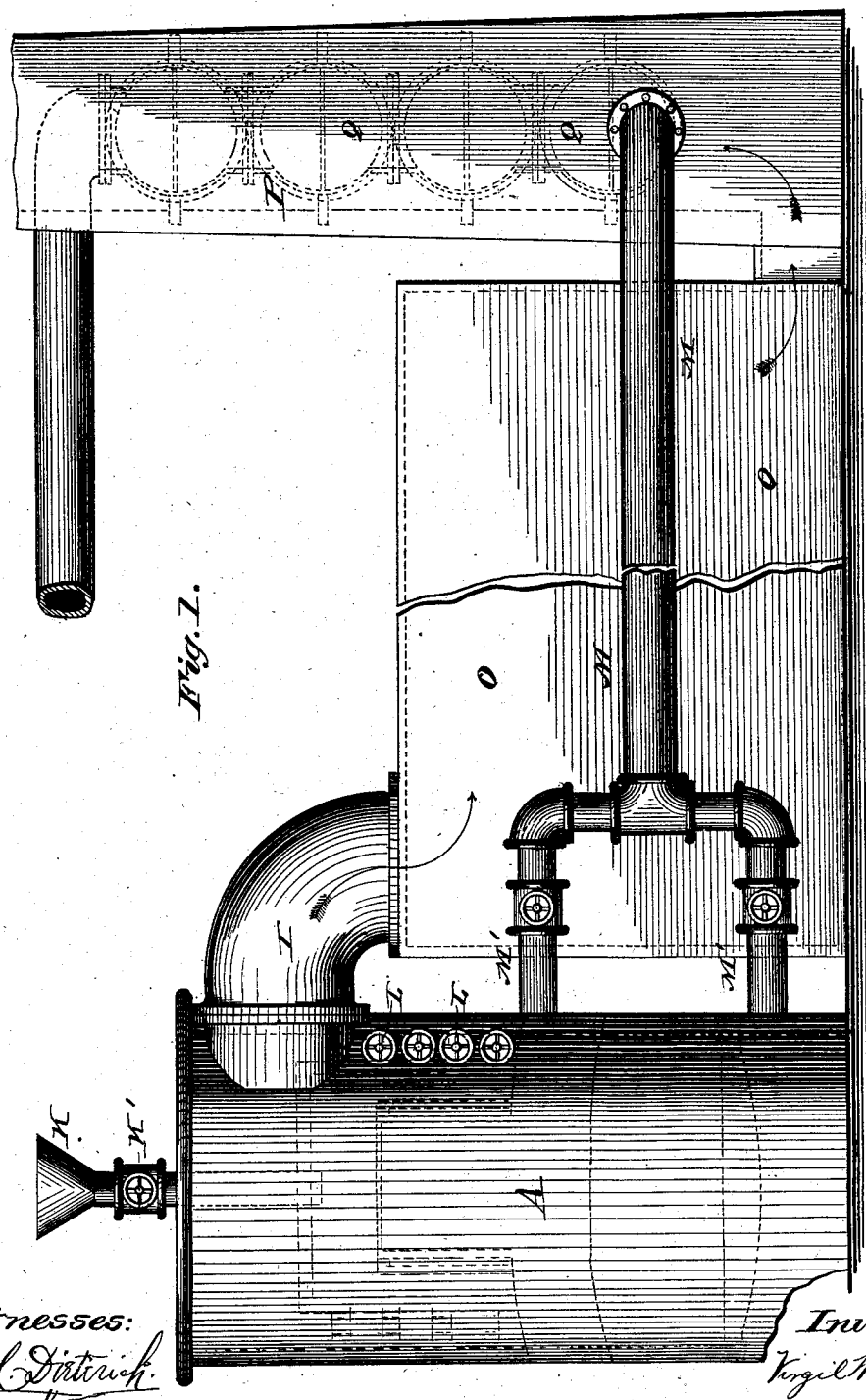
Figure 2:
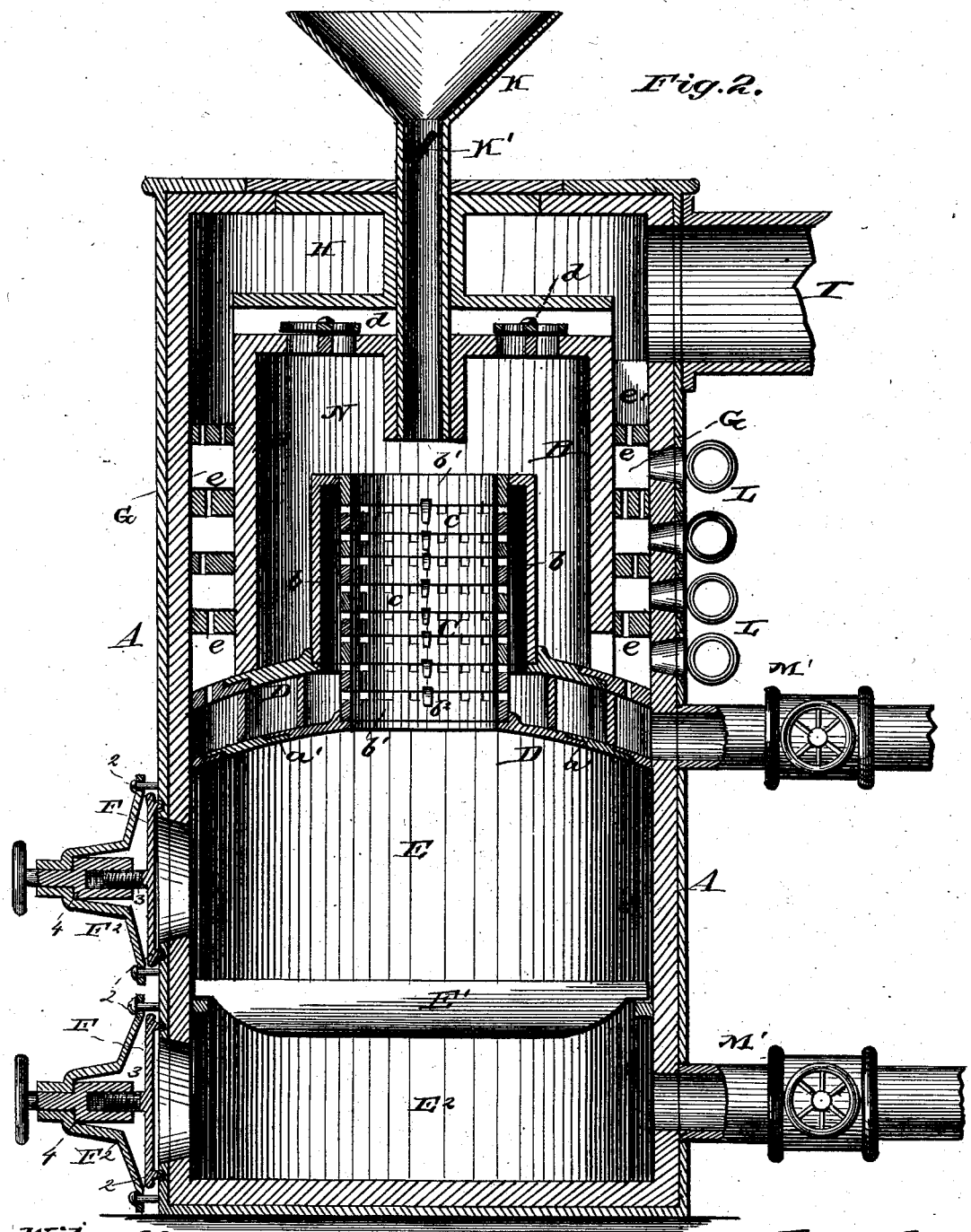
Figure 3:
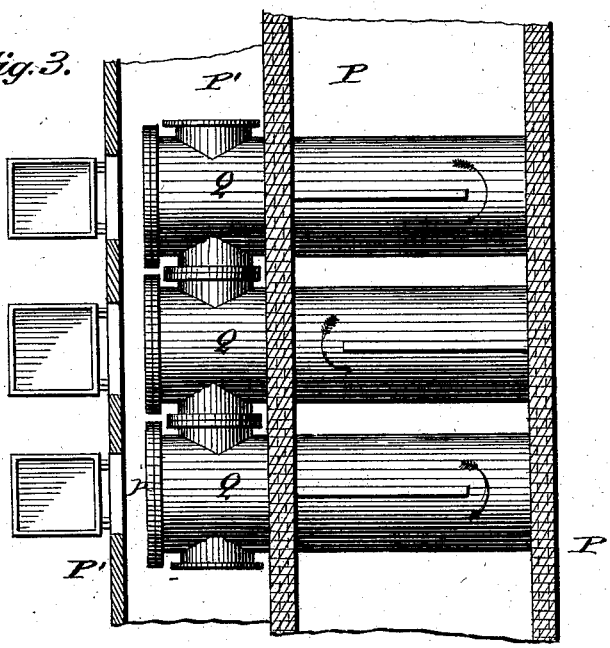
Figure 4:
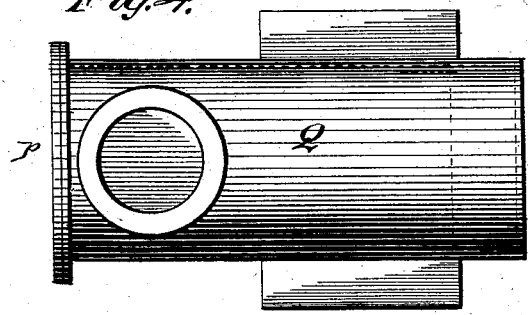
Figure 5:
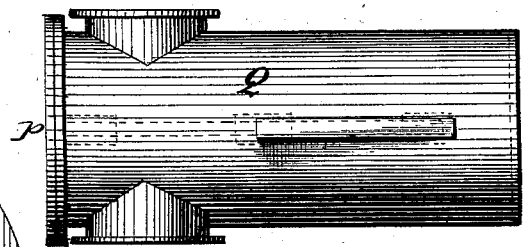
Figure 6:
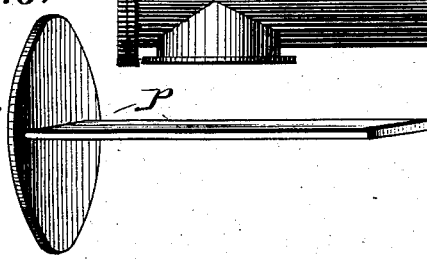

Figure 1 is a side elevation of my improved furnace, a portion of the chimney being broken away and the air-heaters therein being indicated by dotted lines. Fig. 2 is a diametrical section through the furnace, the chimney and intermediate furnace being omitted. Fig. 3 is a vertical section through part of the chimney and its air-heaters. Figs. 4, 5, and 6 are details of the chimney air-heaters. Fig. 7 is a sectional view of one of the furnace-doors, showing the asbestus packing. Fig. 8 is a perspective view of one of the interlocking fire-brick sections.

My invention relates to furnaces which are designed for steam-generators, reverberatory furnaces, and for all purposes where it is designed to obtain a very intense degree of heat at a great saving of fuel.

My object is, mainly, to mix heated air under pressure in regulated quantities with the products rising from the distillation of fuel, and to cause said air and products to regurgitate or descend upon and into a bed of incandescent fuel, whereby complete combustion and intense heat are obtained at a great saving of fuel.

Other features of my invention, together with those above briefly referred to, will be fully understood from the following description, when taken in connection with the annexed drawings.

The letter A designates an upright cylindrical surface, which is composed of an outer wall of boiler-iron internally lined with fire-brick, as shown in the vertical sectional view.

E designates the fire-chamber; E', the grate, and E² the ash-pit. The fire-chamber and the ash-pit are both provided with openings, which are hermetically sealed by doors F. These doors are constructed alike, and each door consists of a frame, F', having headed lugs formed on it, adapted to receive the bifurcated ends of the yoke F². The door proper is of circular form, and has a V-shaped rib, 2, formed on its internal surface; also, a central male screw, 3, which is tapped into a shouldered hub, 4, on the end of a hand-wheel stem having its bearing in the yoke F². The frame F' has an annular V-shaped groove in it corresponding in diameter to the V-shaped rib on the door, and in this rib is packed asbestus paper, forming a non-destructible gasket, 5. When the door is screwed home, the rib 2 will embed itself into the gasket and form an air-tight joint, which will not be affected by the intense heat to which it is subjected.

The fire-chamber is crowned by a concavo-convex diaphragm or dome, D, from the center of which rises a double-wall cylindrical magazine, C, through which the liquid or solid fuel is fed to the fire-chamber from a funnel-shaped feeder, K, provided with a regulating-valve, K', and through which magazine the products of combustion rise before entering the primary mixing-chamber N. The diaphragm D is composed of hollow sections having lapped or slip joints $a'$, which will allow for free expansion and contraction of the parts. This diaphragm affords a convolute conduit for air, which enters at its circumference from one of the branches M' of an air-pipe, M, the other branch M' of which enters the ash-pit, for producing the common draft of the furnace to support combustion. The air, which is highly heated in the hollow diaphragm D, enters at the base of the chamber $b$, formed between the two cylindrical walls of the magazine C, the upper end of which chamber is closed.

The double-wall magazine C consists of an outer wall of metal and an inner wall, formed of a pile of fire-brick rings, $b'$, adjusted one upon the other and held in place by lugs $b^2$. The tops of the rings are radially grooved, so as to form perforations $c$, through which air is forcibly injected into the center of the magazine, to mix with the carbonic oxide rising from the incandescent fuel in the fire-chamber. It is obvious that the magazine is perfectly free to expand and contract without injury to it.

Above and surrounding the magazine C is a chamber, N, which receives the products of combustion from this magazine, and which is surrounded by a wall, B, of fire-brick. The base of this chamber N is the top of the diaphragm D, and the top of this chamber N is provided with registers $d$, which are designed for regulating the escape of the products of combustion when a direct outlet of the chimney is desired.

Surrounding the wall B is what I shall denominate a "mixing-chamber," G, and above this chamber, and forming an expanded upper part of it, is a chamber, H, into which the mixed gases collect before they escape from the furnace through the large flue-pipe I. The mixing-chamber G is subdivided by horizontal partitions $e$, and also by a vertical imperforated division, $e'$, which latter is located between two vertical rows of doors, L, for a purpose hereinafter explained. The mixing-chamber G communicates at its lower end only with the chamber N, surrounding the magazine C, so that the products of combustion escaping from this magazine are compelled to dive down on the outside thereof before entering the base of the mixing-chamber. The horizontal partitions or rings in this chamber G are made of fire-brick, and they have apertures through them so relatively arranged that the gases are compelled to take a tortuous or zigzag course in their upward flight, thus causing them to become intimately mixed as well as reheated. This mixture of gases at an intense heat passes off through the flue I to any point desired. In the present instance, O designates the external furnace-wall of a steam-generator with which the said flue I communicates for the purpose of supplying heat for the generation of steam, and from this furnace O there is a communication with a chimney or uptake, P.

As a matter of course the walls and partitions of the mixing-chamber G will from time to time become clogged with ashes, and it will be necessary to get rid of the same. This is most effectually accomplished by introducing a hose-nozzle into the several openings L on one side of the vertical division $e'$, and injecting steam under considerable pressure into the mixing-chamber. The force of the steam thus injected will quickly blow the ashes out of the openings on the opposite side of said vertical divisions $e$. The openings should then be closed by doors, which are constructed and packed as described for the doors F.

The chimney P communicates with the furnace O or with a reverbratory or any other furnace, and in this chimney are arranged a series of short horizontal pipes, Q, which communicate with each other at their outer ends or heads by means of flanged closely-packed joints. The lowest pipe, Q, of the series, communicates with the pipe M, above referred to, and the highest pipe of the series communicates with an air-forcing engine of any suitable construction. By this means air under pressure is forced into the hollow diaphragm and through the other passages leading into the magazine C, and also into the ash-pit $E^2$, beneath the grate. I thus not only produce an artificial draft of any desired force, but I furnish by means of the air a large supply of oxygen for the decomposition of carbonic oxide rising from the fire-chamber, thus largely utilizing fuel by maintaining as perfect a combustion as is possible to obtain. The coupled heads of the pipes Q are outside of the chimney and inclosed in a box, P', having openings opposite the end of each head, provided with suitable doors. The head of each pipe Q has a division-plate, $p$, secured to it, which extends nearly to the inner free end of the pipe Q in the center thereof. Outside of each pipe, and diametrically opposite each other, are wings or flanges, which form in the chimney, when the series of pipes are taken together, alternate or zigzag passages for the upward flight of the partly-spent heated products of combustion. The sinuous course which the products take in their upward passage through the chimney retard them long enough to cause them to give off all or nearly all of their heat to the pipes Q, for warming the currents of air, which take a similar zigzag course in their descent through these pipes from the forcing-engine to the furnace.

The subject-matter pertaining to the air-heaters is made the basis for a distinct application for Letters Patent, which application was filed November 9, 1883, Serial No. 111,393.

It will be observed that I have ascending currents of heated products through the chimney, and descending forced currents of air through the short pipes Q arranged in the chimney. I thus practically utilize all of the free heat resulting from combustion in the furnace, and I add to the fuel a very large supply of oxygen taken from the air supplied to the furnace; consequently the result of combustion will be simply the inflammable ash found in the fuel. Where liquid fuel is used, I believe that there will be no loss either of free heat or fuel.

It will also be observed that the air-heating pipes Q are free to expand and contract longitudinally; consequently they will not be liable to crack.

It is obvious from the above description that the fire-chamber, which is between the grate and arched diaphragm D, is practically a retort in which the fuel is distilled under a very high degree of heat, said retort being closed except at the points above described. In this retort oxygen is admitted in such quantities as will, when mixed with the products of combustion, produce an intense heat. It will also be observed that highly-heated gases will be forced into said retort from the primary mixing-chamber through the magazine, the gaseous currents near the heated air-jets thereof taking a downward course and mixing with the incandescent fuel on the grate; thence concentrating and crossing the descending currents, and rising through the center of said magazine into the primary mixing-chamber. From this latter chamber the gases descend outside of the magazine-walls to and through the passages $a$, and again ascend through the secondary mixing-chamber.

Having thus fully described my invention, what I claim as new, and desire to secure by Letters Patent, is—

1. In a furnace for a steam-boiler or other purposes, a double-wall air-circulating magazine arranged over the fire-chamber, the perforated rings above said chamber, and means for forcing the highly-heated air through said rings, substantially as described.

2. The combination of a double-wall furnace, perforated diaphragms arranged in the space between the walls of the furnace, a convolute base, D, communicating with an air-pipe, a central magazine extending into the combustion-chamber N, and means for introducing air below the grate, all constructed and adapted to operate substantially as described.

3. A furnace having double walls above a hollow dome, in combination with a double-wall magazine having an interiorly-perforated wall arranged in a primary mixing-chamber, N, the walls A B, perforated diaphragms applied in a mixing-chamber, G, which communicates at its base with the said primary mixing-chamber and at its top with an outlet, substantially as described.

4. The combination of an annular mixing-chamber in the primary furnace, and air-heaters in a chimney for supplying this chamber with heated air, air-inlets through the top of the dome D, inlets leading into said chamber above the dome and passages $e$, through the diaphragms in said chamber, substantially as described.

5. The combination of the mixing-chamber, means for supplying this chamber with heated air and carbonic oxide, and a secondary mixing-chamber having air-inlets, and provided with horizontal annular perforated diaphragms for uniting the oxygen of the air and the carbonic oxide, substantially as described.

6. The combination of an air-heater, D, a magazine for producing carbonic oxide, and an air-chamber, G, subdivided by horizontal diaphragms, and provided with the inlet for the products of combustion, and the inlets for the heated air, substantially as described.

7. The combination of a mixing-chamber, N, with a furnace for the production of carbonic oxide from bituminous coal, a perforated air-supply magazine, a chamber, G, and means for introducing air through the bed of incandescent fuel, substantially as described.

8. The combination of the means for introducing air into the diaphragm above the fire-bed with means for introducing air below the grate of the furnace, a combustion-chamber below the said diaphragm, a mixing-chamber, N, and a chamber, G, above said diaphragm, all constructed and adapted to operate substantially in the manner and for the purposes described.

9. The combination of the following instrumentalities in a furnace: an ash-pit, means for forcibly injecting air into the same, a combustion-chamber above the grate E', a diaphragm covering the combustion-chamber, a centrally-arranged magazine, a chamber surrounding this magazine, and a double wall forming a chamber into which the products of combustion will pass out through an opening at its base, all constructed and adapted to operate substantially as described.

10. A furnace which is composed of an ash-pit, a combustion and mixing chamber, means for introducing air into the ash-pit under pressure, a dome into which air is introduced under pressure and heated, a magazine in which air is heated and introduced under pressure into the ascending products of combustion, and a remixing-chamber, in which the carbon monoxide is reduced to heat, all substantially in the manner described.

11. The combination of a double-wall furnace, walls which are perforated to form tortuous channels therethrough, an internal mixing-chamber, and a double-wall magazine communicating with the said chamber, substantially as described.

12. The combination of an internally-perforated magazine, a convolute base therefor, means for supplying air thereto, a double-wall mixing-chamber, G, above said base, and a mixing-chamber, N, surrounded by said chamber G, substantially in the manner and for the purposes described.

13. The combination of a fire-chamber, the concavo-convex sectional expansion and contraction dome thereof, and the double internally-perforated magazine thereof, all constructed and adapted to operate substantially in the manner and for the purposes described.

14. The combination of a furnace having double walls and perforated diaphragms between the walls, the internal air-heater, the mixing-chamber for the heated air and carbonic oxide, and the pipes leading to an air-forcing engine for the free supply of oxygen to the highly-heated products of combustion, all substantially in the manner and for the purposes described.

15. The combination of a fire-chamber and air pipe below the grate therein, a hollow sectional dome, an air-pipe communicating therewith, a centrally-arranged magazine having an internal perforated diaphragm surrounded by a chamber communicating with said dome, a mixing-chamber above the dome, and a reheating-chamber surrounding the mixing-chamber and communicating therewith, substantially as and for the purposes described.

16. In a fire-brick furnace, a primary mixing-chamber or regurgitating-passage, a blast-pipe below the grate, having a regulating-valve, a blast-pipe above the grate, also having a regulating-valve, and a secondary mixing-chamber provided with an air-supply passage, all combined and adapted to operate substantially in the manner and for the purposes described.

17. The method, substantially as herein described, of producing intense heat in a fire-brick furnace, consisting, first, in subjecting the fuel to an upward blast of air while starting a fire; second, partially closing said draft; third, producing a regurgitation of the gases above the fuel by a strong blast of heated air regulated by a valve, and, finally, conducting the gases to a surrounding mixing-chamber supplied with air, whereby they are converted into carbonic-acid gas, substantially as described.

In testimony that I claim the foregoing as my own I affix my signature in presence of two witnesses.

VIRGIL W. BLANCHARD.

Witnesses:
   HENRY P. LISSON,
   GEORGE F. WONSON.